(12) United States Patent
Teh et al.

(10) Patent No.: US 9,502,976 B2
(45) Date of Patent: Nov. 22, 2016

(54) POWER SUPPLY CIRCUIT AND CONTROL METHOD FOR THE SAME

(71) Applicant: Kabushiki Kaisha Toshiba, Minato-ku, Tokyo (JP)

(72) Inventors: Chen Kong Teh, Ota Tokyo (JP); Manabu Yamada, Yokohama Kanagawa (JP)

(73) Assignee: Kabushi Kaisha Toshiba, Tokyo (JP)

( * ) Notice: Subject to any disclaimer, the term of this patent is extended or adjusted under 35 U.S.C. 154(b) by 93 days.

(21) Appl. No.: 14/634,528

(22) Filed: Feb. 27, 2015

(65) Prior Publication Data

US 2016/0065062 A1    Mar. 3, 2016

(30) Foreign Application Priority Data

Aug. 27, 2014 (JP) ................................. 2014-173089

(51) Int. Cl.
H02M 3/158 (2006.01)
H02M 3/157 (2006.01)

(52) U.S. Cl.
CPC ........... *H02M 3/157* (2013.01); *H02M 3/1584* (2013.01); *H02M 2003/1586* (2013.01)

(58) Field of Classification Search
CPC ... H02M 3/156; H02M 3/157; H02M 3/1588
USPC .......................... 323/271, 282, 283, 284, 285
See application file for complete search history.

(56) References Cited

U.S. PATENT DOCUMENTS

| | | | |
|---|---|---|---|
| 7,208,921 B2 | 4/2007 | Walters | |
| 7,449,869 B2* | 11/2008 | Markowski | H02M 3/157 323/265 |
| 7,557,554 B2* | 7/2009 | Chang | H02M 3/157 323/284 |
| 7,872,456 B2* | 1/2011 | Li | H02M 3/1588 323/224 |
| 7,969,132 B2 | 6/2011 | Hibi | |
| 9,024,611 B2* | 5/2015 | Lee | H02M 3/156 323/271 |
| 9,041,376 B2* | 5/2015 | Weng | H02M 1/36 323/283 |
| 2004/0051510 A1* | 3/2004 | Saggini | H02M 3/157 323/282 |
| 2010/0270989 A1* | 10/2010 | Sasaki | H02M 3/157 323/282 |
| 2013/0207625 A1* | 8/2013 | Futamura | G05F 1/10 323/271 |
| 2014/0253066 A1* | 9/2014 | Teh | H02M 3/1584 323/272 |
| 2015/0280563 A1* | 10/2015 | Tang | H02M 3/158 323/271 |
| 2016/0013720 A1* | 1/2016 | Yamada | H02M 1/38 323/271 |

(Continued)

FOREIGN PATENT DOCUMENTS

| | | | |
|---|---|---|---|
| JP | 2007-523587 A | 8/2007 | |
| JP | 2007-282443 A | 10/2007 | |

(Continued)

OTHER PUBLICATIONS

Mengmeng Du et al., "A 5-MHz 91% Peak-Power-Efficiency Buck Regulator With Auto-Selectable Peak-and-Valley-Current Control", IEEE Journal of Solid-State Circuits, vol. 46, No. 8, pp. 1928-1939 (Aug. 2011).

*Primary Examiner* — Jeffrey Sterrett
(74) *Attorney, Agent, or Firm* — White & Case LLP (57) ABSTRACT

According to an embodiment, a power supply circuit is provided. The power supply circuit includes a switching transistor which is controlled to be ON/OFF by a PWM signal, and a mode switching control circuit configured to switch a control mode between peak current mode control and valley current mode control depending on the length of an ON time of the PWM signal which drives the switching transistor.

20 Claims, 6 Drawing Sheets

(56) References Cited

U.S. PATENT DOCUMENTS

| | | | |
|---|---|---|---|
| 2016/0056719 A1* | 2/2016 | Teh | H02M 3/157 323/283 |
| 2016/0065062 A1* | 3/2016 | Teh | H02M 3/157 323/283 |
| 2016/0172974 A1* | 6/2016 | Teh | H02M 3/158 323/271 |

FOREIGN PATENT DOCUMENTS

| | | |
|---|---|---|
| JP | 2008-067505 A | 3/2008 |
| WO | 2005/079486 A2 | 9/2005 |

\* cited by examiner

POWER SUPPLY CIRCUIT AND CONTROL METHOD FOR THE SAME

CROSS-REFERENCE TO RELATED APPLICATIONS

This application is based upon and claims the benefit of priority from Japanese Patent Application No. 2014-173089, filed on Aug. 27, 2014; the entire contents of which are incorporated herein by reference.

FIELD

An embodiment described herein relates generally to a power supply circuit and a control method for the same.

BACKGROUND

A power supply circuit using PWM control is conventionally known. The power supply circuit outputs a desired output voltage by controlling, by a PWM signal, ON/OFF of a switching transistor, in which a main current path is connected between an input terminal and an output terminal. The PWM control controls falling of a PWM signal by a comparison between a feedback current and a predetermined control value. Therefore, in the case where an ON time of the PWM signal is short, more specifically in the case where a Duty is small, a circuit configuration for comparing a feedback current and a control value at a high speed becomes necessary. To realize a circuit configuration capable of a high speed circuit operation, generally a circuit consumes a large amount of power. It is necessary to manage to achieve control of a power supply circuit with low power consumption in the case where an ON time of a PWM signal is short.

DETAILED DESCRIPTION

According to the present embodiments, a power supply circuit is provided. The power supply circuit includes a first switching transistor in which a main current path is connected between an input terminal and an output terminal, and which is controlled to be ON/OFF by a PWM signal. The power supply circuit includes a mode switching control circuit having a first mode and a second mode and configured to switch between the first mode and the second mode depending on the length of an ON time of the PWM signal. The first mode is configured to control pulse width of the PWM signal by a predetermined timing signal and a timing when a feedback current becomes larger than a preset first control value. The second mode is configured to control pulse width of the PWM signal by the timing signal and a timing when the feedback current becomes smaller than a preset second control value.

The power supply circuit and a control method for the same according to the embodiments will be described below in detail with reference to the accompanying drawings. The present invention is not limited to the following embodiments.

First Embodiment

Figure 1:
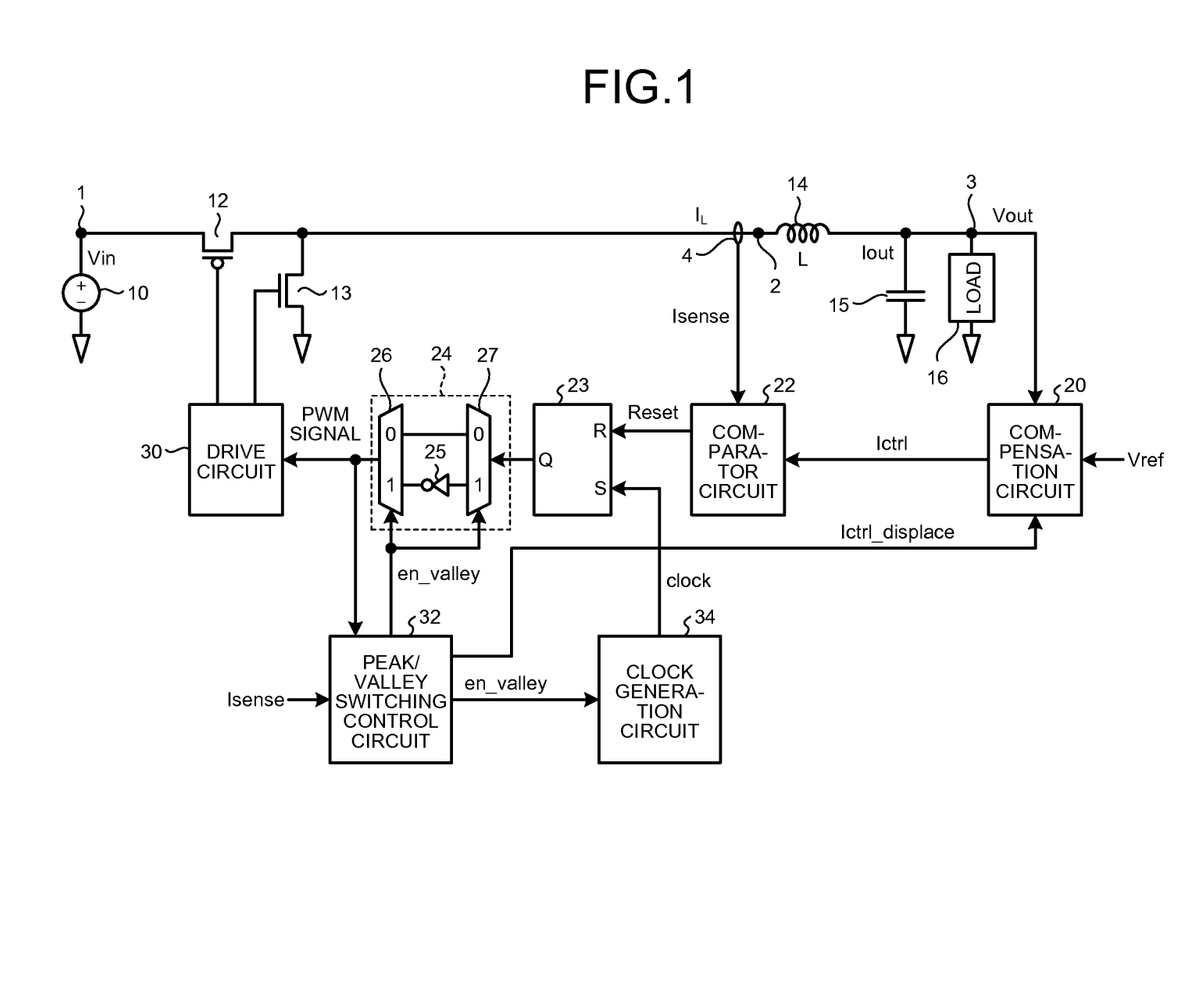
FIG. 1 is a diagram illustrating a configuration of a power supply circuit according to a first embodiment.

FIG. 1 is a diagram illustrating a configuration of a power supply circuit according to a first embodiment. The power supply circuit according to the embodiment includes an input terminal 1. The input terminal 1 is connected to an input voltage source 10 for supplying a DC voltage Vin. The input terminal 1 is connected to a source electrode of a first switching transistor 12. A drain electrode of the first switching transistor 12 is connected to a terminal 2. A gate electrode of the first switching transistor 12 is connected to a drive circuit 30. ON/OFF of the first switching transistor 12 is controlled by a drive signal from the drive circuit 30. A source/drain path, which is a main current path of the first switching transistor 12, is connected between the input terminal 1 and an output terminal 3.

A drain electrode of a second switching transistor 13 is connected to the drain electrode of the first switching transistor 12. A source electrode of the second switching transistor 13 is connected to ground. A gate electrode of the second switching transistor 13 is connected to the drive circuit 30. ON/OFF of the second switching transistor 13 is controlled by a driving signal from the drive circuit 30 in a complementary manner to the first switching transistor 12.

The terminal 2 is connected to one end of an inductance 14. Another end of the inductance 14 is connected to the output terminal 3. The output terminal 3 is connected to one end of a smoothing capacitor 15. Another end of the smoothing capacitor 15 is connected to ground. The output terminal 3 is connected to a load 16. An output voltage Vout of the output terminal 3 is supplied to the load 16.

The output voltage Vout is supplied to a compensation circuit 20. The compensation circuit 20 is supplied with a predetermined reference voltage Vref. The compensation circuit 20 compares the output voltage Vout and the reference voltage Vref, performs proportional integral derivative (PID) control so that the output voltage Vout becomes equal to the reference voltage Vref, and generates and outputs a control value Ictrl for the control.

The control value Ictrl is supplied to a comparator circuit 22. The comparator circuit 22 is supplied with a feedback current Isense which is obtained from an inductance current $I_L$ flowing in the main current path of the first switching transistor 12. A current sensor 4 includes, for example, a resistor (not illustrated) connected in series to the inductance 14 and a differential amplifier (not illustrated) for detecting voltage drop which occurs in the resistor. The inductance current $I_L$ is supplied to the output terminal 3 through the inductance 14 and supplied to the load 16 as an output current Iout. Therefore, a load current, more specifically the output current Iout, can be detected by detecting the inductance current $I_L$ and returning the inductance current $I_L$ as the feedback current Isense.

The comparator circuit 22 compares the feedback current Isense and the control value Ictrl and supplies an RS latch circuit 23 with a reset signal Reset when the feedback current Isense becomes larger than the control value Ictrl.

A set input end S of the RS latch circuit 23 is supplied with a clock signal clock from a clock generation circuit 34. An output of the RS latch circuit 23 is supplied to a selection circuit 24. The selection circuit 24 includes a selection gate 27 and a selection gate 26. The selection gates (26 and 27) are controlled by a mode switching enable signal en_valley from a peak/valley switching control circuit 32. For example, when the mode switching enable signal en_valley is at a high level, a path through an inverter 25 is selected. More specifically, an output signal of the RS latch circuit 23 is inverted and then output.

An output signal of the selection circuit 24 is supplied to the drive circuit 30 as a PWM signal. The drive circuit 30, in response to the PWM signal, supplies gate electrodes of the first switching transistor 12 and the second switching transistor 13 with driving signals. ON/OFF of the first switching transistor 12 and ON/OFF of the second switching transistor 13 are complementarily controlled. When the first switching transistor 12 is ON, the output voltage Vout increases. More specifically, during an ON time of the first switching transistor 12, the output voltage Vout is controllably increased.

A PWM signal is supplied to the peak/valley switching control circuit 32. The peak/valley switching control circuit 32 compares an ON time of the PWM signal and a predetermined threshold. For example, by using an AND gate (not illustrated), an ON time of a PWM signal can be calculated by counting, with a counter (not illustrated), a periodic clock signal (not illustrated) passing through during the ON time of the PWM signal, more specifically a high level period. Also, a preset count number can be used as a threshold. When an ON time of a PWM signal is shorter than a predetermined threshold, a control mode is switched to valley current mode control. As a control signal therefor, the peak/valley switching control circuit 32 outputs a mode switching enable signal en_valley.

In valley current mode control, a reset signal Reset is output when the feedback current Isense becomes smaller than the control value Ictrl in the comparator circuit 22. In this manner, a lower limit of the feedback current Isense is controlled. In peak current mode control, the reset signal Reset is controllably output when the feedback current Isense becomes larger than the control value Ictrl. In this manner, an upper limit of the feedback current Isense is controlled.

In the case where an ON time of a PWM signal becomes shorter than a predetermined threshold and a comparison between a steeply rising feedback current and the control value Ictrl is necessary, by switching a control mode to a valley current mode, the control mode can be switched to a mode, in which the slowly falling feedback current Isense and the control value Ictrl are compared. Therefore, for example, a request to the comparator circuit 22 for a high speed operation is decreased, and a circuit can be configured to save power consumption.

The clock generation circuit 34 includes, for example, a ring oscillator (not illustrated) and a counter (not illustrated). Rising and falling of the clock signal clock of the clock generation circuit 34 can be controlled by appropriately setting a count value of the counter. For example, a clock signal clock, which rises at a zeroth count value of a reference clock signal (not illustrated) of the ring oscillator and falls at an N-th count value thereof, can be generated. A signal of a reference frequency (not illustrated) supplied from outside may be used.

The peak/valley switching control circuit 32 supplies the clock generation circuit 34 with a mode switching enable signal en_valley. The clock generation circuit 34 shifts a phase of the clock signal clock and outputs the clock signal clock in response to the mode switching enable signal en_valley. This is for smoothly switching to the peak current mode control. A phase shift of the clock generation circuit 34 will be described later.

The peak/valley switching control circuit 32 is supplied with a feedback current Isense. The peak/valley switching control circuit 32 supplies the compensation circuit 20 with a rewrite signal Ictrl_displace in order to rewrite the control value Ictrl of the compensation circuit 20 in conjunction with switching of a control mode. For example, when a control mode is switched from peak current mode control to valley current mode control, a compensation coefficient of the compensation circuit 20 is rewritten so that the control value Ictrl from the compensation circuit 20 becomes equal to a value of the lowest point (a valley value) of the feedback current Isense before the switching. By such control, a valley value of the feedback current Isense in the case of switching from the peak current mode control to the valley current mode control can be equalized to a valley value before the switching. Therefore, a variation of the output voltage Vout associated with switching of a control mode can be reduced, and a control mode can be smoothly switched. Also, when a control mode is switched from the valley current mode control to the peak current mode control, the compensation coefficient of the compensation circuit 20 can be rewritten so that the control value Ictrl from the compensation circuit 20 becomes equal to a value of the highest point (a peak value) of the feedback current Isense before the switching.

The control value Ictrl output from the compensation circuit 20 is, for example, represented by the following formula (1).

$$Ictrl[n]=Ictrl[n-1]+a\times error[n]+b\times error[n-1]+c\times error[n-2]+d\times error[n-3] \quad (1)$$

Herein, error represents an error value, and a, b, c, and d represent compensation coefficients. Also, [n] represents a current value, [n−1] represents a value one cycle before, [n−2] represents a value two cycles before, and [n−3] represents a value three cycles before.

By forcibly rewriting the compensation coefficient of the compensation circuit 20 in conjunction with switching of a control mode, the control value Ictrl after rewriting can be set to a valley value of the feedback current Isense before switching or a value equal to a peak value.

According to the embodiment, in the case where an ON time of a PWM signal becomes shorter than a predetermined time, the peak current mode control can be switched to the valley current mode control. By switching the peak current mode control to the valley current mode control, a search time to perform comparison between the feedback current Isense and the control value Ictrl can be prolonged. Therefore, for example, even if the comparator circuit 22, which compares the feedback current Isense and the control value Ictrl, is not a high speed operating circuit that consumes a large amount of power, the comparator circuit 22 can be configured to compare the feedback current Isense and the control value Ictrl. More specifically, a consumption current can be lowered, and a power supply circuit with a high conversion efficiency can be provided. Also, a ripple of the output voltage Vout can be reduced by equalizing a new control value Ictrl after a control mode has been switched with a valley value of the feedback current Isense before the switching. Also, by controlling whether the output of the RS latch circuit 23 is inverted by the selection circuit 24 in response to the mode switching enable signal en_valley, a circuit which can supply the drive circuit 30 with the output of the selection circuit 24 as a PWM signal, can be provided.

Second Embodiment

Figure 2:
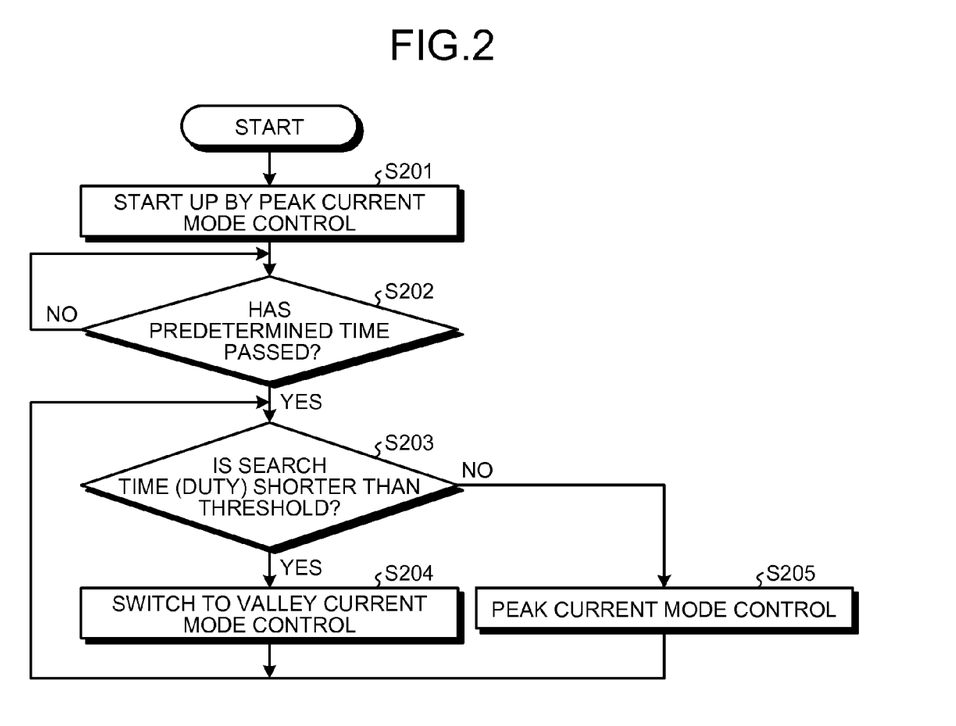
FIG. 2 is a flowchart illustrating a flow of a control method for a power supply circuit according to a second embodiment.

FIG. 2 is a flowchart illustrating a flow of a control method for a power supply circuit according to a second embodiment. In the control method according to the embodiment, peak current mode control is applied when the power supply circuit starts (S201). When a power source starts, the output current Iout is likely to be increased due to a rush current. Therefore, peak current mode control, in which a peak value of the output current Iout is controlled, is preferable. Also, since a Duty of a PWM signal is not determined when a power source starts, peak current mode control is preferably applied when a power source starts.

It is determined whether a predetermined time to stabilize the power supply circuit has passed (S202). After the predetermined time has passed, it is determined whether an ON time of the PWM signal, more specifically a search time, is shorter than a predetermined threshold (S203). In the case of PWM control, whether an ON time of the PWM signal, more specifically the search time, is longer or shorter than the predetermined threshold is determined depending on whether the Duty is larger or smaller than the predetermined threshold.

When the search time is shorter than the predetermined threshold, a control mode is switched to valley current mode control (S204). In the case where a search time in the peak current mode control is short, the search time can be prolonged by switching to the valley current mode control.

When the search time is longer than the threshold, the peak current mode control is continuously applied (S205).

According to the embodiment, the peak current mode control is applied when the power supply circuit starts. As a result, increase in an output current due to a rush current when the power source starts can be suppressed. Also, after the predetermined time has passed, a control mode is switched depending on an ON time of the PWM signal, more specifically the search time. In this manner, the search time can be prolonged by switching from the peak current mode control to the valley current mode control in the case where the search time is short. For this reason, for example, even if the comparator circuit 22 is not a high speed operating circuit, which consumes a large amount of power, it can compare the feedback current Isense and the control value Ictrl. Therefore, a power supply circuit which reduces power consumption and has a high conversion efficiency can be provided. In the case where the output voltage Vout is constant, a control mode can be switched by detecting an input voltage Vin. This is because, in the case where the output voltage Vout is constant, the Duty of the PWM signal can be estimated based on the input voltage Vin. Also, in the case where the output voltage Vout fluctuates, a control mode may be switched by detecting the input voltage Vin and the output voltage Vout and estimating the Duty of the PWM signal.

Third Embodiment

Figure 3:
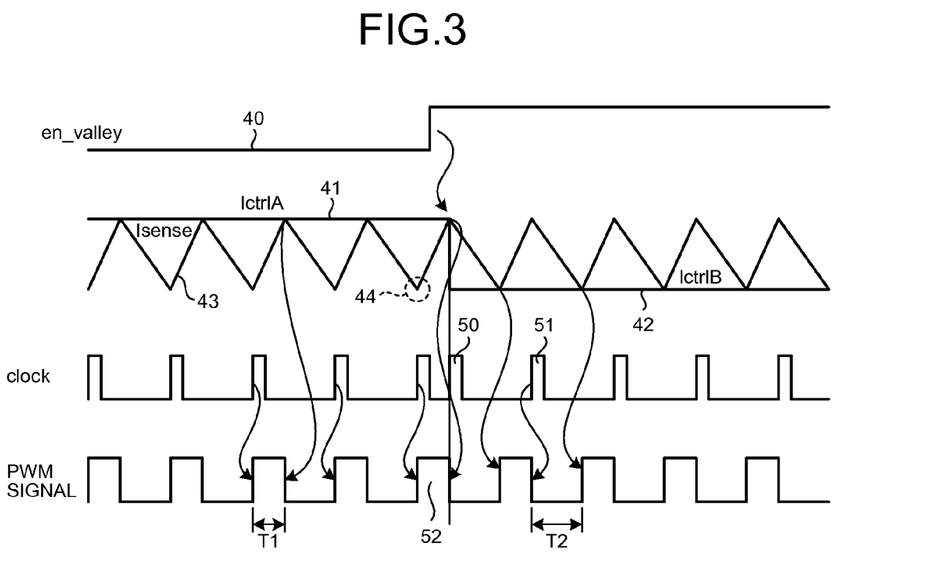
FIG. 3 is a diagram for describing a control method for a power supply circuit according to a third embodiment.

FIG. 3 is a diagram for describing a control method for a power supply circuit according to a third embodiment. The embodiment illustrates setting of the control value Ictrl and a phase shift of the clock signal clock in the case of switching from peak current mode control to valley current mode control.

By detecting that a search time or a Duty of a PWM signal has become smaller than a threshold, a mode switching enable signal en_valley denoted with a line 40 on an upper line of FIG. 3 becomes a high level. When the mode switching enable signal en_valley becomes a high level, a control mode is switched from the peak current mode control to the valley current mode control. More specifically, a control mode is switched from the peak current mode control, in which rising of the PWM signal is controlled by the clock signal clock, and the PWM signal falls at a timing when a feedback current Isense denoted with a line 43 exceeds a control value IctrlA denoted with a line 41, to the valley current mode control, in which rising of the PWM signal is controlled at a timing when the feedback current Isense becomes smaller than a control value IctrlB denoted with a line 42, and falling of the PWM signal is controlled by the clock signal clock.

When a control mode is switched from the peak current mode control to the valley current mode control, the compensation coefficient of the compensation circuit 20 is rewritten so that the control value IctrlB after the switching becomes equal to a value of the lowest point 44 of the feedback current Isense before the switching. In this manner, a ripple of the output voltage Vout associated with switching from the peak current mode control to the valley current mode control can be reduced.

The clock generation circuit 34 outputs a clock signal 50 at a timing when the feedback current Isense exceeds the control value IctrlA. For example, the clock signal 50 is generated by resetting a counter of the clock generation circuit 34 by the mode switching enable signal en_valley from the peak/valley switching control circuit 32. More specifically, the clock signal 50 is subjected to phase shift and output at a timing before mode switching. Then, based on a count value of a counter appropriately set, clock signals clock after a clock signal 51 are sequentially output from the clock generation circuit 34. More specifically, clock signals clock, which control falling of PWM signals, are output from the clock generation circuit 34. Falling of a PWM signal 52 just before switching from the peak current mode control to the valley current mode control is controlled at a timing when the feedback current Isense becomes higher than the control value IctrlA.

By switching from the peak current mode control to the valley current mode control, a search time, which is T1 in the peak current mode control, is switched to a time T2 obtained by subtracting a time T1 from one cycle. More specifically, the search time can be prolonged. Since a circuit configuration is switched to a configuration, in which a slowly falling feedback current Isense and the control value Ictrl are compared, for example, the comparator circuit 22 does not have to be a high speed operation circuit, a circuit with low power consumption can be configured. Also, when a control mode is switched from the peak current mode control to the valley current mode control, the control mode can be smoothly switched by shifting a phase of a clock signal clock to be supplied.

Fourth Embodiment

Figure 4:
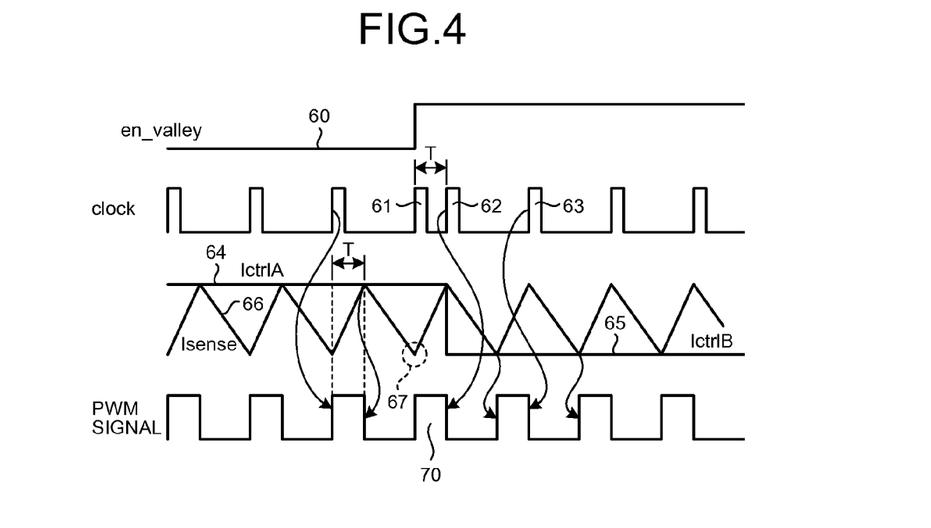
FIG. 4 is a diagram for describing a control method for a power supply circuit according to a fourth embodiment.

FIG. 4 is a diagram for describing a control method for a power supply circuit according to a fourth embodiment. The embodiment illustrates setting of the control value Ictrl and a phase shift of the clock signal clock in the case of switching from peak current mode control to valley current mode control. When a search time falls below a predetermined threshold, a mode switching enable signal en_valley denoted with a line 60 on an upper part of the figure becomes a high level, and a control mode is switched from the peak current mode control to the valley current mode control.

In the peak current mode control, rising of a PWM signal is controlled by a clock signal clock, and falling of the PWM signal is controlled at a timing when a feedback current Isense denoted with a line 66 becomes larger than a control value IctrlA denoted with a line 64.

In response to a timing when the mode switching enable signal en_valley becomes a high level, the peak/valley switching control circuit 32 shifts a phase of the clock signal clock of the clock generation circuit 34. This phase shift is, for example, performed by outputting a clock signal 62 at a timing delayed for a threshold T of a search time from a clock signal 61 just before the phase shift For example, a phase can be shifted by controlling a counter (not illustrated) which is included in the clock generation circuit 34 and controls a timing of outputting the clock signal clock and by outputting the clock signal 62 by resetting the counter at a count value corresponding to the search time T. Falling of a PWM signal 70 just after a control mode has been switched to the valley current mode control is controlled by the clock signal 62, which has been subjected to phase shift.

After the phase shift, control is returned to an ordinary operation, more specifically the counter is reset when a count value of the counter becomes a predetermined full count value, and a succeeding clock signal 63 is output. As a result, in the valley current mode control, rising of the PWM signal is controlled at a timing when the feedback current Isense denoted with the line 66 becomes smaller than a control value IctrlB denoted with a line 65, and falling of the PWM signal is controlled by the clock signal clock.

When a control mode is switched from the peak current mode control to the valley current mode control, the control value IctrlB of the valley current mode control is set by using a valley value 67 of the feedback current Isense before the switching. The compensation coefficient of the compensation circuit 20 is rewritten so that the control value IctrlB becomes equal to the valley value 67. As a result, a fluctuation of an average value of the feedback current Isense before and after switching of a control mode can be reduced. Therefore, a ripple of the output voltage Vout associated with switching from the peak current mode control to the valley current mode control can be reduced. Also, when a control mode is switched from the valley current mode control to the peak current mode control, the control value Ictrl when the control mode has been switched to the peak current mode control can be set by using a peak value of the feedback current Isense before the switching.

In the embodiment, when a control mode is switched from the peak current mode control to the valley current mode control, a phase shift for outputting the clock signal clock at a timing delayed for the threshold T of the search time from the clock signal clock before the switching is performed. Falling of the PWM signal can be precisely controlled since falling of a first PWM signal, which is generated after switching by the clock signal clock subjected to phase shift can be controlled.

Fifth Embodiment

Figure 5:
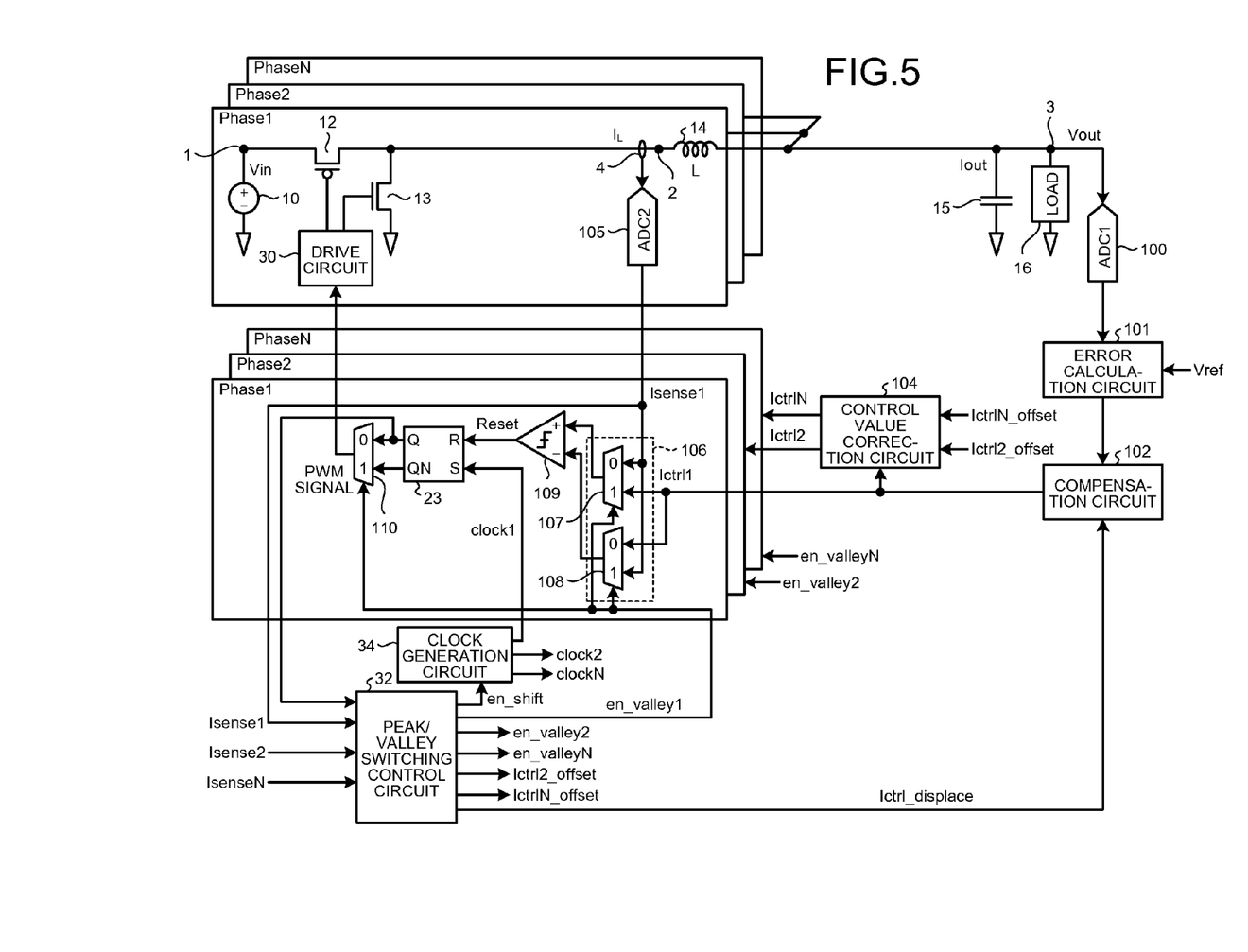
FIG. 5 is a diagram illustrating a configuration of a power supply circuit according to a fifth embodiment.

FIG. 5 is a diagram illustrating a configuration of a power supply circuit according to a fifth embodiment. Components corresponding to those in the embodiments described above are denoted with the same signs. The present embodiment has a configuration of a so-called multiphase power supply circuit. In the multiphase power supply circuit, an output voltage Vout, which is stable and has a low ripple, can be obtained by combining output currents of multiple DC/DC converters operating at different phases. The figure illustrates a DC/DC converter of Phase1 of a first phase, and Phase2 and PhaseN have a similar configuration. Hereinafter, a configuration of the Phase1 will be used for description. The output voltages Vout of the DC/DC converters of the phases (Phase1, Phase2, and PhaseN) are combined at an output terminal 3.

In the embodiment, through an AD converter 100 connected to the output terminal 3, a digitized output voltage Vout is supplied to an error calculation circuit 101. In the error calculation circuit 101, the output voltage Vout and a reference voltage Vref are compared, and an error value is calculated and supplied to a compensation circuit 102. The compensation circuit 102 performs the proportional integral derivative (PID) control so that the output voltage Vout becomes equal to the reference voltage Vref, and generates and outputs a control value Ictrl1 for the PID control. The error calculation circuit 101 and the compensation circuit 102 are shared by the DC/DC converters in the phases (Phase1, Phase2, and PhaseN).

The control value Ictrl1 from the compensation circuit 102 is supplied to a control value correction circuit 104 and a selection circuit 106. The selection circuit 106 includes selection gates (107 and 108). The selection gates (107 and 108), in response to a mode switching enable signal en_valley1 from a peak/valley switching control circuit 32, switch a signal supplied to a comparator circuit 109. When the mode switching enable signal en_valley1 is at a low level, more specifically during the peak current mode control, a feedback current Isense1 supplied through an AD converter 105 is supplied to a non-inverting input port (+) of the comparator circuit 109, and the control value Ictrl1 is supplied to an inverting input port (−) of the comparator circuit 109. When the mode switching enable signal en_valley1 is at a high level, more specifically during the valley current mode control, the feedback current Isense1 supplied through the AD converter 105 is supplied to the inverting input port (−) of the comparator circuit 109, and the control value Ictrl1 is supplied to the non-inverting input port (+) of the comparator circuit 109.

A reset signal Reset of the comparator circuit 109 is supplied to a reset input port R of an RS latch circuit 23. A clock signal clock1 from a clock generation circuit 34 is supplied to a set input port S of the RS latch circuit 23. An output signal of the RS latch circuit 23 is supplied to a selection circuit 110. The selection circuit 110, in response to the mode switching enable signal en_valley1 from the peak/valley switching control circuit 32, selects output of a non-inverting output port Q and an inverting output port QN from the RS latch circuit 23, and supplies a drive circuit 30 with a PWM signal. When the mode switching enable signal en_valley1 is at a low level, more specifically during the peak current mode control, an output signal of the non-inverting output port Q of the RS latch circuit 23 is supplied to the drive circuit 30. When the mode switching enable signal en_valley1 is at a high level, more specifically during the valley current mode control, an output signal of the inverting output port QN of the RS latch circuit 23 is supplied to the drive circuit 30.

The output signal of the non-inverting output port Q of the RS latch circuit 23 is supplied to the peak/valley switching control circuit 32. The peak/valley switching control circuit 32 compares an ON time of the output signal from the non-inverting output port Q, more specifically a search time, and a predetermined threshold. When the search time falls below the threshold, the mode switching enable signal en_valley1 is output, and a control mode is switched to the valley current mode control. The output signal of the non-inverting output port Q of the RS latch circuit 23 is set at the clock signal clock1, and is reset by a signal of the comparator circuit 109. More specifically, an ON time of the non-inverting output port Q of the RS latch circuit 23 corresponds to an ON time of the PWM signal during the peak current mode control. Therefore, comparison between the predetermined threshold and the ON time of the non-inverting output port Q of the RS latch circuit 23 can be used for determination of switching between the peak current mode control and the valley current mode control.

The peak/valley switching control circuit 32 supplies the clock generation circuit 34 with a control signal en_shift for shifting a phase of the clock signal clock1 output from the clock generation circuit 34. As described above, this phase shift is control for outputting the clock signal clock1 at a timing delayed for a predetermined time when a control mode is switched from the peak current mode control to the valley current mode control. The clock generation circuit 34 supplies clock signals (clock2 and clockN) to the corresponding multiphase DC/DC converters. Each of the clock signals (clock2 and clockN) is output at a timing delayed for a predetermined timing from the clock signal clock1 of the Phase1. The predetermined timing is, for example, adjusted so that a peak timing and a valley timing of the feedback current Isense of each phase complement each other.

The embodiment includes the control value correction circuit 104. The control value correction circuit 104 generates control values (Ictrl2 and IctrlN) for the respective phases (Phase2 and PhaseN) by using the respective correction values (Ictrl2_offset and IctrlN_offset) based on the control value Ictrl1 of the Phase1 generated by the peak/valley switching control circuit 32. In the case where each phase (Phase2 and PhaseN) has a different current value, if control values after a control mode has been switched are the same, the output voltage Vout has a ripple because a timing when feedback currents (Isense2 and IsenseN) of the phases (Phase2 and PhaseN) reach the control value Ictrl1 fluctuates due to switching of a control mode. For this reason, occurrence of the ripple of the output voltage Vout due to mode switching can be reduced by correcting the control values (Ictrl2 and IctrlN) in the phases (Phase2 and PhaseN). Corrected control values (Ictrl2 and IctrlN) are supplied to the corresponding phases (Phase2 and PhaseN).

In the embodiment, a multiphase power supply circuit includes the control value correction circuit 104, in which the control value Ictrl after a control mode has been switched is corrected in each phase (Phase2 and PhaseN) depending on a value of the feedback current Isense of each phase. By such configuration, a ripple of the output voltage Vout associated with switching of a control mode is reduced. A search time can be prolonged by switching from the peak current mode control to the valley current mode control when the search time is short. Therefore, for example, the necessity for increasing a response speed of the AD converter 105, which supplies a digitized feedback current Isense, is reduced, and power consumption for speeding up the AD converter 105 can be reduced.

Sixth Embodiment

Figure 6:
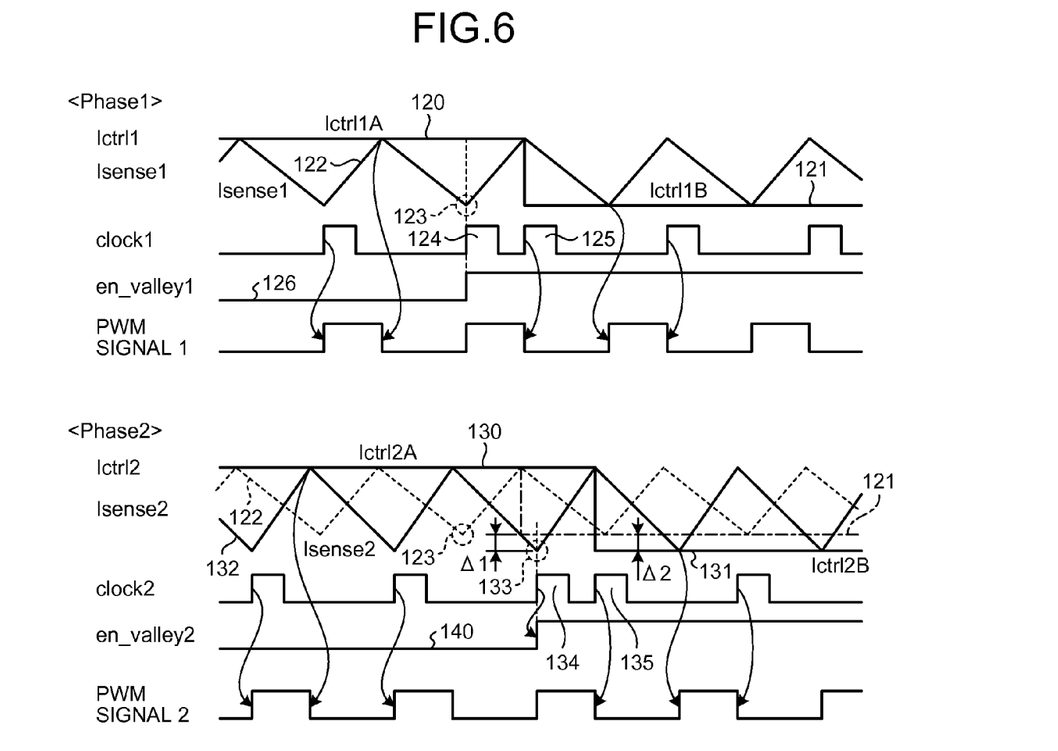
FIG. 6 is a diagram for describing a control method for a power supply circuit according to a sixth embodiment.

FIG. 6 is a diagram for describing a control method for a power supply circuit according to a sixth embodiment. FIG. 6 is a diagram for describing, by taking a case of two phases as an example, an embodiment in the case of switching from the peak current mode control to the valley current mode control in a multiphase power supply circuit. An upper drawing in the figure illustrates control in Phase1.

When an ON time of a PWM signal 1, more specifically a search time, becomes shorter than a predetermined threshold, a mode switching enable signal en_valley1 denoted with a line 126 output from the peak/valley switching control circuit 32 becomes a high level, and a control mode is switched from the peak current mode control to the valley current mode control. More specifically, a control mode is switched from a control mode, in which rising of the PWM signal 1 is controlled by a clock signal clock1 and falling of the PWM signal 1 is controlled at a timing when a feedback current Isense1 denoted with a line 122 exceeds a control value Ictrl1A denoted with a line 120, to a control mode, in which falling of the PWM signal 1 is controlled by the clock signal clock1 and rising of the PWM signal 1 is controlled at a timing when the feedback current Isense1 becomes smaller than a control value Ictrl1B denoted with a line 121.

When a control mode is switched from the peak current mode control to the valley current mode control, the phase of the above-mentioned clock signal clock1 is shifted. More specifically, a clock 125 is supplied at a timing when a phase is shifted from a clock signal 124 of the clock signal clock1. The control value Ictrl1B after mode switching is set so as to be equal to a valley value 123 of the feedback current Isense1 before the mode switching. Under control of a rewrite signal Ictrl_displace output by the peak/valley switching control circuit 32, the compensation coefficient of the compensation circuit 102 is rewritten so that the control value Ictrl1B after the mode switching becomes equal to the valley value 123.

Control in Phase2 is as follows. In the peak current mode control, falling of a PWM signal 2 is controlled at a timing when a feedback current Isense2 exceeds a control value Ictrl2A denoted with a line 130. For example, the clock generation circuit 34 generates and outputs a clock signal clock2 in a cycle that is a half of a cycle of the clock signal clock1. This is for complementing valleys between peaks of an output current of the Phase1 by an output current of the Phase2 and equalizing the output currents. A mode switching enable signal en_valley2 of the Phase2 denoted with a line 140 is synchronized with the clock signal clock2 and output. When the mode switching enable signal en_valley2 of the Phase2 becomes a high level, a control mode is switched from the peak current mode control to the valley current mode control. When the control mode is switched from the peak current mode control to the valley current mode control, a phase shift of the clock signal clock2, as described above, is performed just like the Phase1. More specifically, a clock 135 is supplied at a timing when a phase is shifted from a clock signal 134 of the clock signal clock2.

A control value Ictrl2B after mode switching is generated by correcting the control value Ictrl1B of the Phase1 after the mode switching with a difference value Δ1 between a valley value 123 of the feedback current Isense1 of the Phase1 before the mode switching and a valley value 133 of the feedback current Isense2 of the Phase2 denoted with a line 132. More specifically, the control value Ictrl2B after the mode switching denoted with a line 131 is set, for example, after being corrected to a value which is Δ2 (corresponding to the above-mentioned correction value Ictrl2_offset) lower than the control value Ictrl1B denoted with a line 121. Therefore, when a control mode is switched to the valley current mode control, the difference value Δ1 between the feedback current Isense1 and the feedback current Isense2 before the mode switching is reflected in the difference value Δ2 between the control value Ictrl1B and the control value Ictrl2B after the mode switching. For example, the difference value Δ1 and the difference value Δ2 are equal. In this manner, after a control mode has been switched, the feedback current Isense2 is compared with the control value Ictrl2B which has been corrected, not with the control value Ictrl1B of the Phase1. As a result, a timing of comparing the feedback current Isense2 and the control value Ictrl2A before mode switching can be maintained after a control mode has been switched. Therefore, since a rising timing and a falling timing of a PWM signal before a control mode is switched are maintained after the control mode has been switched, occurrence of a ripple of the output voltage Vout associated with switching of a control mode can be reduced.

According to the control method for the power supply circuit according to the embodiment, in a multiphase power supply circuit, the control value Ictrl after mode switching is corrected in each phase in view of a difference in feedback current Isense between phases. Therefore, a control mode can be switched while a ripple of an output voltage Vout associated with switching of the control mode is reduced.

Seventh Embodiment

Figure 7:
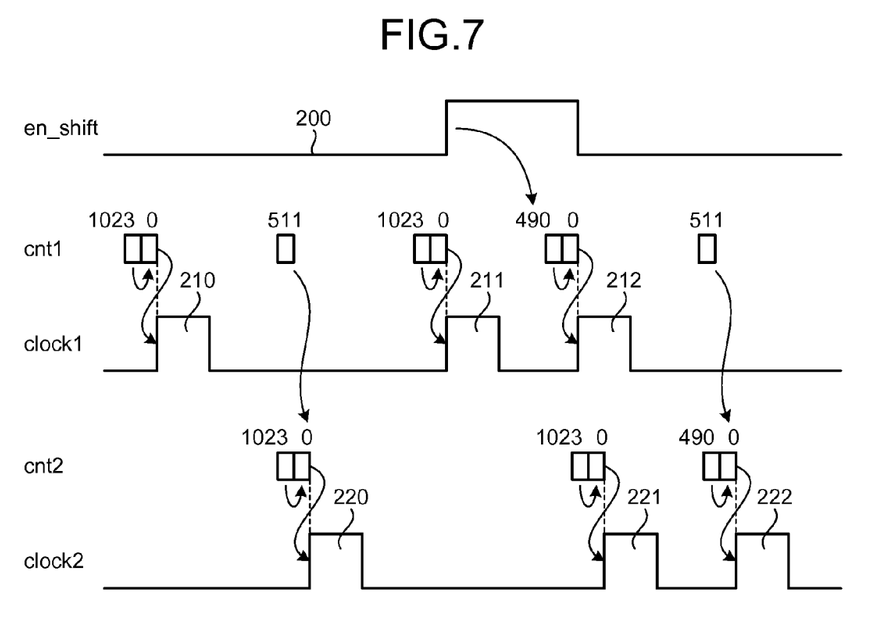
FIG. 7 is a diagram for describing a control method for a power supply circuit according to a seventh embodiment.

FIG. 7 is a diagram for describing a control method for a power supply circuit according to a seventh embodiment. The embodiment illustrates generation and a phase shift of the clock signal clock in a multiphase power supply circuit with two phases. A line 200 illustrated in an upper part of the figure is a control signal en_shift which is supplied to a clock generation circuit 34 by the peak/valley switching control circuit 32 when a mode is switched.

For example, the clock generation circuit 34 includes a 10-bit counter (not illustrated). In a steady state, for example, a counter cnt1 for generating a clock signal clock1 for the Phase1 reaches a full count at a count value of 1023, and generates clock signals (210 and 211) at the next count. More specifically, one cycle is 1024 counts. A counter cnt2 for generating a clock signal clock2 for the Phase2 also reaches a full count value at 1023 counts. The counter cnt2 is reset when a counter value of the counter cnt1 reaches 511, returns to zero at the next count, and generates the clock signals (220 and 221). By generating the clock signal clock2 at a timing in the middle of one cycle of the clock signal clock1 of the Phase1, a valley of the output voltage Vout output in the Phase1 is complemented with the output voltage Vout of the Phase2, and an overall ripple of the output voltage Vout can be reduced.

When the control signal en_shift becomes a high level, a phase of the clock signal clock1 is shifted. In response to the control signal en_shift, the counter cnt1 for setting rising of the clock signal clock1 to be supplied to the Phase1 is, for example, set so as to return to zero at 490 counts indicating a phase shift amount. This count value 490 can be set, for example, corresponding to the above-mentioned threshold of the search time. By such setting, a count value of the counter cnt1 returns to zero at the next count of 490 and a clock signal 212 is generated.

The counter cnt2 for controlling a timing of generating the clock signal clock2 to be supplied to the Phase2 is reset, for example, when a count value of the counter cnt1 for the clock signal clock1 reaches 511. Therefore, the clock signal clock2 is reset when a count value of the counter cnt1 reaches 511, and the count value returns to zero at the next count, and a clock signal 222 is generated. By such control, in response to the control signal en_shift output by the peak/valley switching control circuit 32 when a control mode is switched, a phase shift similar to the phase shift of the clock signal clock1 can be performed to the clock signal clock2 to be supplied to the Phase2. More specifically, a phase shift of the clock signal clock of a multiphase power supply circuit can be controlled in a configuration in which the peak/valley switching control circuit 32 is commonly used.

According to the embodiment, generation and a phase shift of the clock signal clock to be supplied to each phase of a multiphase power supply circuit can be controlled in a configuration in which the peak/valley switching control circuit 32 is commonly used when a control mode is switched. Falling of a first PWM signal generated after the mode switching can be precisely controlled in each phase by the clock signal clock subjected to phase shift.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power supply circuit comprising a first switching transistor in which a main current path is connected between an input terminal and an output terminal, and configured to adjust an output voltage by controlling ON/OFF of the first switching transistor by a PWM signal applied to the first switching transistor, the power supply circuit comprising:
   a mode switching control circuit having a first mode and a second mode and configured to switch between the first mode and the second mode depending on the length of an ON time of the PWM signal; wherein the first mode is configured to control pulse width of the PWM signal by a predetermined timing signal and a timing when a feedback current becomes larger than a preset first control value, and the second mode is configured to control pulse width of the PWM signal by the timing signal and a timing when the feedback current becomes smaller than a preset second control value.

2. The power supply circuit according to claim 1, comprising a compensation circuit configured to compare the output voltage and a reference voltage, to generate the first control value and the second control value from a difference value of the comparison, and to output the first control value and the second control value.

3. The power supply circuit according to claim 1, comprising:
   a comparator circuit configured to compare the first control value or the second control value with the feedback current;
   an RS latch circuit configured to be set by the timing signal and reset by output of the comparator circuit; and
   a selection circuit configured to select either non-inverted output or inverted output of the RS latch circuit in response to a mode switching signal from the mode switching control circuit.

4. The power supply circuit according to claim 2, comprising:
   a comparator circuit configured to compare the first control value or the second control value with the feedback current;
   an RS latch circuit configured to be set by the timing signal and reset by output of the comparator circuit; and a selection circuit configured to select either non-inverted output or inverted output of the RS latch circuit in response to a mode switching signal from the mode switching control circuit.

5. The power supply circuit according to claim 3, comprising a selection circuit configured to switch the first control value or the second control value and the feedback current and supply the switched control value and feedback current to the comparator circuit, in response to a mode switching signal from the mode switching control circuit.

6. The power supply circuit according to claim 4, comprising a selection circuit configured to switch the first control value or the second control value and the feedback current and supply the switched control value and feedback current to the comparator circuit, in response to a mode switching signal from the mode switching control circuit.

7. A multiphase power supply circuit comprising multiple switching transistors in which main current paths are connected in parallel between input terminals and output terminals, and a comparator circuit configured to compare a predetermined control value and feedback currents from the main current paths of the multiple switching transistors, the multiphase power supply circuit being configured to adjust an output voltage by controlling ON/OFF of the multiple switching transistors by a PWM signal, pulse width of which is controlled by output of the comparator circuit and a predetermined timing signal, the multiphase power supply circuit comprising:
- a compensation circuit configured to generate the control value from an error value in the output voltage and a reference voltage;
- a control circuit configured to calculate a difference value between feedback currents from the main current paths of the multiple switching transistors and a lowest value of a feedback current from a main current path of a specific switching transistor among the multiple switching transistors; and
- a control value correction circuit configured to generate a control value corrected by using the control value and the difference value.

8. A control method for a power supply circuit for controlling, by a PWM signal, ON/OFF of a first switching transistor in which a main current path is connected between an input terminal and an output terminal, the control method comprising:
- a first mode in which the pulse width of the PWM signal is controlled according to a predetermined timing signal and a timing when a feedback current from the main current path of the first switching transistor becomes larger than a preset first control value;
- a second mode in which the pulse width of the PWM signal is controlled according to the timing signal and a timing when the feedback current from the main current path of the first switching transistor becomes smaller than a preset second control value; and
- switching between the first mode and the second mode depending on the length of an ON time of the PWM signal.

9. The control method for a power supply circuit according to claim 8, wherein the second control value in the case of switching from the first mode to the second mode is set so as to be equal to a value at the lowest point of the feedback current before switching to the second mode.

10. The control method for a power supply circuit according to claim 8, comprising performing control by the first mode when starting the power supply circuit.

11. The control method for a power supply circuit according to claim 9, comprising performing control by the first mode when starting the power supply circuit.

12. The control method for a power supply circuit according to claim 8, wherein, when a control mode is switched from the first mode to the second mode, the timing signal after the switching is output at a different timing from a timing before the switching.

13. The control method for a power supply circuit according to claim 9, wherein, when a control mode is switched from the first mode to the second mode, the timing signal after the switching is output at a different timing from a timing before the switching.

14. The control method for a power supply circuit according to claim 10, wherein, when a control mode is switched from the first mode to the second mode, the timing signal after the switching is output at a different timing from a timing before the switching.

15. The control method for a power supply circuit according to claim 11, wherein, when a control mode is switched from the first mode to the second mode, the timing signal after the switching is output at a different timing from a timing before the switching.

16. The control method for a power supply circuit according to claim 8, wherein switching from the first mode to the second mode is performed in the case where an ON time of the PWM signal becomes shorter than a preset threshold time, and a first timing signal after the switching is supplied at a timing delayed for the threshold time from rising of a timing signal before the switching.

17. The control method for a power supply circuit according to claim 9, wherein switching from the first mode to the second mode is performed in the case where an ON time of the PWM signal becomes shorter than a preset threshold time, and a first timing signal after the switching is supplied at a timing delayed for the threshold time from rising of a timing signal before the switching.

18. The control method for a power supply circuit according to claim 12, wherein a first timing signal after a control mode has been switched from the first mode to the second mode is supplied at a timing when the feedback current from the main current path of the first switching transistor becomes larger than the first control value.

19. The control method for a power supply circuit according to claim 8, wherein the power supply circuit is a multiphase power supply circuit comprising a second switching transistor in which a main current path arranged between an input terminal and an output terminal is connected in parallel with the first switching transistor, and the power supply circuit calculates a difference between values at the lowest points of the feedback current from the main current path of the first switching transistor and the feedback current from the main current path of the second switching transistor, and corrects a control value for controlling pulse width of a PWM signal to be supplied to the second switching transistor depending on the difference.

20. The control method for a power supply circuit according to claim 19, wherein, when a control mode is switched from the first mode to the second mode, a first timing signal for controlling an ON time of a PWM signal to be supplied to the first switching transistor after the mode switching and a first timing signal for controlling an ON time of a PWM signal to be supplied to the second switching transistor after the switching are each subjected to phase shift for a same time duration and supplied.

* * * * *